United States Patent
Dean

[15] 3,647,395
[45] Mar. 7, 1972

[54] RECOVERING ALKALI METAL SALTS FROM CEMENT KILN GASES BY THE STEPS OF CONDENSING LEACHING AND CRYSTALLIZING

[72] Inventor: Thomas Stanley Dean, Ragland, Ala. 35131
[22] Filed: Oct. 21, 1968
[21] Appl. No.: 769,110

[52] U.S. Cl. ................................... 23/299, 23/302, 23/303, 23/312, 23/310, 23/294
[51] Int. Cl. ................................. B01d 9/02, B01d 11/02
[58] Field of Search .................. 23/312, 309, 310, 270, 297, 23/299, 302, 303, 89, 294; 55/345, 342, 385, 474

[56] References Cited

UNITED STATES PATENTS 2,792,289  5/1957  Wilson ............................... 23/312 X
3,051,314  8/1962  Conn .................................. 23/270 X
3,212,764  10/1965  Muller ............................... 55/345 X
3,236,609  2/1966  MacKinnon ......................... 23/312
3,442,605  5/1969  Osaka ................................ 23/270 X
3,468,633  9/1969  Honchar ............................. 23/270

FOREIGN PATENTS OR APPLICATIONS 237,867  7/1926  Great Britain ........................ 23/312

Primary Examiner—Norman Yudkoff
Assistant Examiner—S. J. Emery
Attorney—Newton, Hopkins & Ormsby

[57] ABSTRACT

Method for recovering substantially pure alkali metal salts from the exhaust gases and dust of a kiln or blast furnace comprising leaching said alkali metal salts from the exhaust gases and dust, concentrating same and precipitating out substantially pure alkali metal salts.

4 Claims, 1 Drawing Figure

PATENTED MAR 7 1972
3,647,395
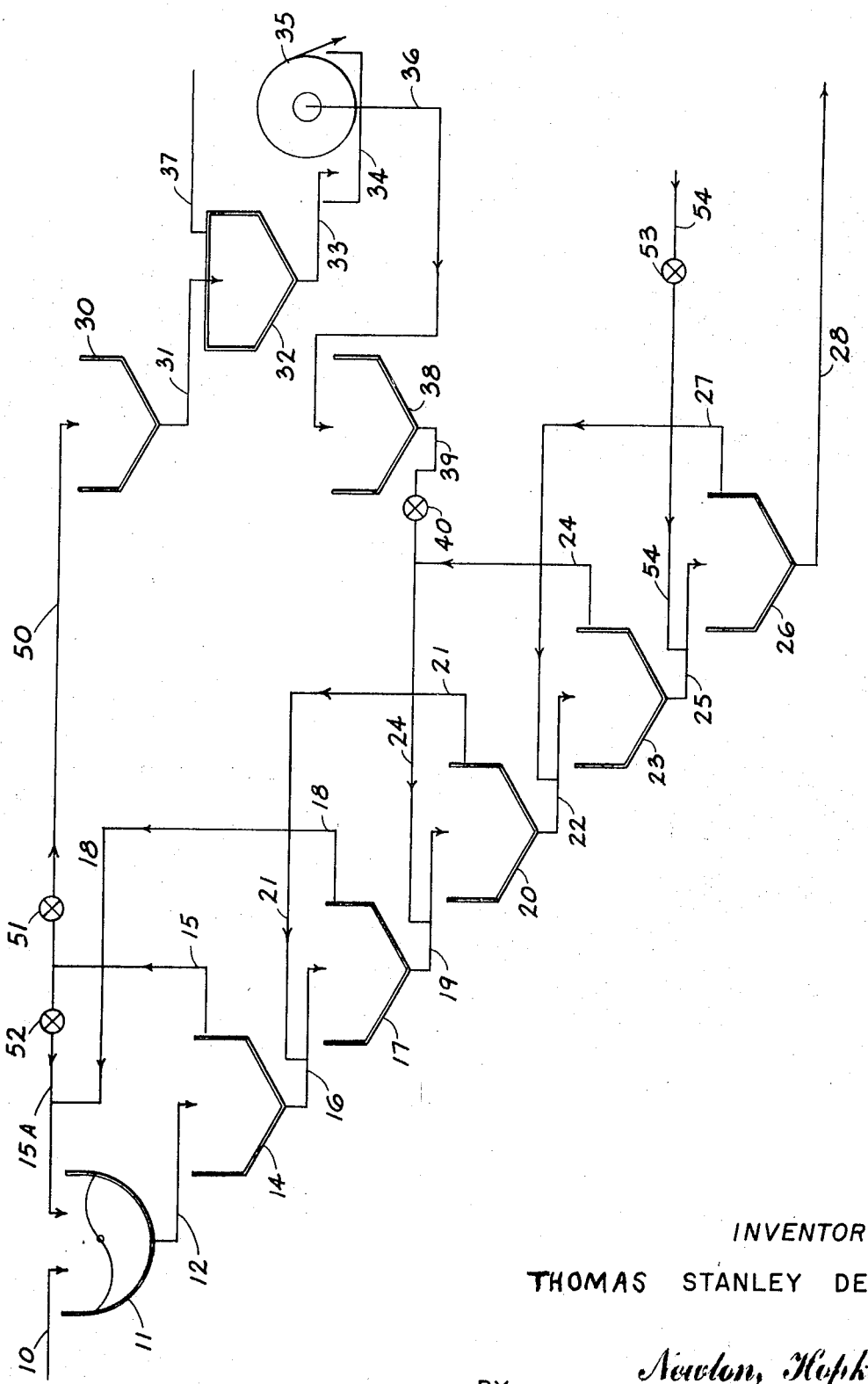
INVENTOR
THOMAS STANLEY DEAN
BY
Newton, Hopkins,
& Ormsby
Attorneys

RECOVERING ALKALI METAL SALTS FROM CEMENT KILN GASES BY THE STEPS OF CONDENSING LEACHING AND CRYSTALLIZING This invention is concerned with the recovery of substantially pure alkali metal salts from exhaust gases and dust of a kiln or blast furnace. More specifically, this invention is concerned with the recovery ans sale of substantially pure alkali metal salts which are a by product of a kiln or blast furnace operation.

While the present invention is generally directed to the exhaust gases and dust of any furnace or kiln operation in which alkali metal salts are present, it is directed specifically to the recovery of substantially pure alkali metal salts from exhaust gases and dust from the kilns of a cement-producing operation.

As is well known in the art, most cement raw materials contain alkali metal compounds in some amounts. As these raw materials enter the clinkering zone of a cement kiln, a portion of the alkalies are volatized and are carried by the exhaust gases toward the exit door of the kiln and removed from the kiln itself. In many of these installations, these exhaust gases and dust are vented into the atmosphere where they may cause a pollution problem. During the clinkering or burning of the cement raw materials, these alkali metals are converted into alkali metal sulfates or chlorides and these compounds if vented into the atmosphere carry along with them the sulfates or chlorides radicals themselves. Both of these materials will cause air pollution problems. Additionally, it is well known to dissolve these alkali metal sulfates or chlorides in water after they leave the kiln or blast furnace and then once in solution they are discharged into any open stream. This also causes pollution problems in the water of that area. The pH of the stream may be increased to the point where fish and water life will be killed. In addition, the volatilized parts of the raw material used in producing cement which has been carried out of the kiln with discrete particles will form dissolved solids in the water which, if allowed in too concentrated form are toxic to and will kill fish and water life. Also, the fine discrete particles of the raw materials themselves are not easily removed from the discharge water and therefore there is an increase in the suspended solids which may kill fish and other water life if allowed to increase in concentration.

These exhaust gases from a cement-manufacturing plant kiln will carry with it finely divided particles of raw materials themselves. Thus, there is an economic loss of the raw materials if these discrete particles are exhausted into the atmosphere or discharged into an open stream or lake. This is costly in that there is a loss of part of the raw materials used in the production of concrete clinkers.

Along with the discrete particles of the raw materials carried from the kiln as previously pointed out, alkali metal salts, usually sulfates, are also moved from the kiln. It is of importance that these alkali metal sulfates which are soluble in water, be removed from the water which may be discharged into an open stream or sewer system. If they can be recovered in a substantially pure condition, they will bring a reasonable price on the open market and thus the cost of producing one barrel of cement clinkers will be substantially reduced. Further, if an attempt is made to turn the discrete particles of raw materials to the kiln itself, without removal of these alkali metal salts there will be a buildup of these salts in the cement clinkers themselves which is most objectionable. As these salts are water soluble, and if this cement is used in construction of roads or buildings, when exposed to the weathering effects of rain, this will result in the alkali metal salts being leached from the cement and results in it cracking which is most objectionable, especially in the surfacing of highways. In addition, with an increase in the alkali metal salts content of the cement clinkers, the cement thus produced would not meet Federal, State or ASTM specifications as to alkali metal content and therefore there would be a very limited sales market.

It is therefore the primary object of this invention to provide a method for removing and recovering soluble alkali metal salts, primarily sulfates, from kiln exhaust gases and dust.

A further object of this invention is to provide a method for separating these alkali metal salts from the discrete particles of raw materials which are both carried out of the kiln in exhaust gases so that the discrete particles of raw materials may be returned to the kiln for further processing.

An additional object of this invention is to provide a method for the removal of soluble alkali metal salts from exhaust gases from a kiln so that they may be in a substantially pure condition and thus available for sale as by product.

A still further object of this invention is to provide a method for removing the alkali metal salts from the exhaust gases and dust of a kiln which is simple and economical.

An additional object of this invention is to provide a method for removing alkali metal salts from the exhaust gases and dust of a kiln so that there will be no air or water pollution problems created by discharging these salts into the air or into a stream of water.

These and other objects will become apparent from the following detailed description of the present invention.

Generally the objects of this invention are achieved by dissolving these water soluble alkali metal salts in water and separating them from the discrete particles of raw materials.

More specifically, these discrete particles of raw materials and also the volatile alkali metal salts leave the kiln in exhaust gases at a very high temperature. The alkali metal salts are condensed by any conventional method such as reducing the temperature of the exhaust gases below the volatilization temperature of the alkali metal salts. During this stage the discrete particles of the raw materials and the alkali metal salts become intimately mixed. In addition, one can use a conventional electrostatic precipitator, a cyclone, a bag-type collector, a water scrubber or any other conventional method of collecting dust from a cement kiln. It is not of importance how the dust or particles are collected from the kiln.

As pointed out hereinbefore, in most burning processes whether the fuel is gas, coal or oil, there is to a greater or lesser degree volatile matters given off in the combustion air. Usually this volatile matter is more or less soluble in water or other solvents. This soluble matter usually consists of sulfates, chlorides, sulfides, and polysulfides of potassium, sodium and the other alkali metals. In addition, to a much less extend the metal that is being refined may also be present in this exhaust gas.

When directed to the exhaust gases or flue dust collected from cement kilns, this dust which is collected from the exhaust gases is generally composed of discrete particles of limestone, shale, said and iron ore or any other raw materials that is used in the manufacture of a particular cement. These discrete particles are not very soluble in water or other solvents. As pointed out hereinbefore, these discrete particles also contain the alkali metal salts mainly sodium and potassium, but they are generally water soluble and also soluble in other solvents. This difference in the solubility of the original raw materials discrete particles in the alkali metal salts and the fact that these salts are more soluble in hot water and other hot solvents than they are in cold water is of importance.

This dust, which contains discrete particles of the raw materials as well as the alkali metal salts, is first thoroughly mixed with water in a mixing chamber. The exact proportions of each is not of importance as long as enough water is added so that a mechanical separation is possible. Because of the physical characteristics of cement flue dust it is preferred to have the water to dust ratio of 10 to 1 or better. It is also thought that some of the alkali metal salts are physically entrapped during the condensing period within or inside the discrete particles of the raw materials. Further, this slurry of dust and water may sometimes be exposed to pressure in order to make the less soluble alkali metal salts dissolve.

After the dust is thoroughly mixed, and pressurized if desired, the dust water slurry is heated and then the undissolved part is separated from the dissolved part of the dust by any of several methods, for example, in a settling tank, filtration or passing through a centrifuge. After separation the clarified water, containing dissolved alkali metal salts, is the pumped back to be used with additional flue dust, thus increasing the percentage composition of the water-soluble alkali metal salts in this water. The discrete particles of the raw materials which are not dissolved in the water but which are in the dewatered slurry, are again thoroughly mixed with water. The temperature of this first few tanks are elevated so that a concentration of alkali metal salts may be obtained that will form a super saturated solution when the temperature is later lowered. The insoluble discrete particles and the water containing dissolved alkali metal salts are again separated. The water from this separation goes back to the preceding mixing tank to replace the water that was removed from the dust or discrete particles after the first separation. The discrete particles which are not dissolved but are in the dewatered slurry are sent to a next mixing vessel and again mixed with water to be separated.

This leaching operation is continued in successive steps. After each separation, the solids go to the next separating zone and the water containing some water-soluble alkali metal salts goes to the preceding zone to be mixed with the incoming slurry to that tank, the slurry being a mixture of water and dust or insoluble discrete particles of the raw materials as defined hereinbefore.

The exact number of leaching operations will depend on two factors. First, the desired concentration of the solubles in the solvent of the first mixing tank and second the concentration of the solubles in the slurry or dust and water after the last separation.

The clarified water in the first tank is allowed to increase its concentration of soluble alkali metal salts at an elevated temperature until a concentration is reached which would be a supersaturated solution at a lower temperature. Once this concentration of solubles in the first separating zone is reached, then an equilibrium is maintained by crystallizing out the same amount of soluble alkali metal salts as is added by new particles or dust which is run through the system. This crystallization is accomplished by removing an amount of water containing the soluble alkali metal salts from the first separating zone and cooling the saturated water, these soluble alkali metal salts are then recovered from the system by filtering the water while it is cooled. After filtering the solution, the water is then returned to the tank which has the closest percentage of soluble alkali metal salts in it of this returned solution. This percentage is small as nearly all the soluble alkali metal salts are removed. It is not of importance to which separating zone or tank this water is returned to, as it may be one with a higher or one with a lower concentration of soluble alkali metal salts that it contains itself.

The discrete particles of the raw materials and the particles of the alkali metal salts, which have condensed from exhaust gases of a blast furnace or kiln, the dust from a kiln not shown in the drawing, are carried through pipe 10 into mixing chamber 11 where these particles are thoroughly mixed with water. The ratio of water to solids should be at least (7) seven parts of water by weight to one part of solid by weight, with the preferred ratio being 10 to 1. It has been found that if the water to solids ratio is much below 7 to 1, a gel is formed which, of course, will be very difficult to pump as a practical matter.

Once a slurry is produced in the mixing tank, it is carried through pipe 12 into separating device 14 where the slurry is maintained at a temperature of just below boiling or between 140° to 200° F. This separating device may be any mechanical equipment used to separate a slurry into two fractions, one fraction with a low specific gravity and one fraction with a higher specific gravity. These devices may include such equipment as settling tanks, filters, centrifuges or hydrocyclones. The separating device 14 separates the slurry into two fractions, clarified water and dewatered slurry.

The clarified water is maintained with a concentration of 150 g. of the dissolved alkali metal salts per liter of solution. This clarified water is then fed through pipe 15, valve 52 and pipe 15A into the mixing chamber 11 to be used with incoming dust to form additional slurry. Some of this clarified water is fed through valve 51 and pipe 50 to crystallizer holding tank 30. This occurs when the equilibrium of the entire separating system has been reached and is maintained at 150 g. of alkali metal salts per liter of water. The above dewatered slurry is intimately mixed in pipe 16 with the clarified water from settling device 20 to form a slurry and is maintained at a temperature of 100° to 175° F. It is noticed that the temperature may be maintained at a somewhat lower temperature than the clarified water from settling device 14. This slurry is fed into separating device 17 through pipe 16.

The separation device 17 separates the slurry into two fractions, clarified water and dewatered slurry. The concentration of the alkali metal salts in this clarified water is maintained at about 80 g. to 140 g. per liter of solution and is fed through pipe 18 and pipe 15A back to the original mixing tank 11 where it is used as mixing water to form additional slurry. Thus the concentration of the alkali metal salts and the clarified water can be maintained somewhat lower then the clarified water concentration from separating device 14. It is of importance that the total clarified water leaving separating devices 14 and 17 and which is flowing into the mixing chamber 11 should equal the total amount of water flowing out of the mixing chamber 11 through pipe 12.

The dewatered slurry from separating device 17 is intimately mixed in pipe 19 with the clarified water from separating device 23 and the water, that has the excess alkali metal salts removed from it, from the crystallizer 32, to form a slurry and the total is fed into separating device 20. This slurry is maintained at a temperature of around 60° to 130° F. Separating device 20 separates the slurry into two fractions, clarified water and dewatered slurry. This clarified water is maintained at a concentration of approximately 40 g. to 100 g. per liter of the alkali metal salts.

The dewatered slurry from separating device 20 is intimately mixed in pipe 22 with the clarified water from separating device 26 to form an additional slurry. This slurry is fed into separating device 23 and maintained at a temperature of about 50° to 100° F. This separating device 23 separates the slurry into two fractions, clarified water containing dissolved alkalimetal salts and the dewatered slurry.

The clarified water from separating device 23 is fed through pipe 24 and is intimately and thoroughly mixed with the dewatered slurry from separating device 17 in pipe 19 along with the water from the crystallizer. The concentration of the alkali metal salts in this clarified water is maintained at from 20 g. to 60 g. per liter of solution. The dewatered slurry leaving separating device 23 is intimately and thoroughly mixed in pipe 25 with fresh water entering the system through pipe 54 and is fed into separating pipe 26. This separating device separates the slurry into two fractions, clarified water and dewatered slurry. The clarified water is fed through pipe 27 and is mixed intimately and thoroughly in pipe 22 with the dewatered slurry leaving separating device 20. The concentration of the alkali metal salts in this clarified water is maintained at approximately 10 g. to 40 g. per liter of solution and above a temperature of 50° F. The dewatered slurry from separating device 26 is fed back into the kiln or blast furnace to be processed again, through pipe 28.

The word slurry used hereinbefore, is a mixture of flue dust and water. The phrase clarified water as used hereinbefore, is the part having the lower specific gravity after the slurry has passed through a separating device. It will contain all three elements involved in this process, a solvent, dissolved solids and suspended solids. The phrase dewatered slurry as used hereinabove, is a mixture of dust and water after the mixture has passed through a separating device. This fraction will have the higher specific gravity of the two parts remaining after separation. It will also contain a solvent, dissolved solids and suspended solids. The main difference between dewatered slurry and clarified water at any given stage will be the percent of solvent and the percent of solids.

The amount of moisture in the dewatered slurry leaving a separating device is not of importance. However, a practical range will be 30 percent to 40 percent moisture. The crystallizer, described hereinafter, will return water at a concentration of between 60 to 60 g. per liter of the alkali metal salts. The concentration of these salts in the clarified water when it leaves the first separating device is arbitrarily held at 150 g. of alkali metal salts per liter of solution.

The saturated or super saturated solution of the alkali metal salts are sent into crystallizer holding tank 30 from separating device 14 through pipe 15, pump 51 and pipe 50. When holding tank 30 is full, this solution is directed to crystallizer 32 through pipe 31. Once this solution is in the crystallizer, it is cooled by any of the well known methods such as running chilled water around the outside of the crystallizer in pipes or by vacuum cooling. It is not of importance the exact process used in cooling the solution.

After cooling has taken place, most of the alkali metal salts have precipitated out as crystals and are mechanically separated from the solution by any of several well-known methods of separation. The solids or crystals may be withdrawn from container 34 by way of drum 35 where the crystals are then sent to a dryer. Once the alkali metal salts crystals and the solution have been separated, the solution containing a very small amount of unprecipitated alkali metal salts is fed back into the system through pipe 36 to storage tank 38, through pipe 39, valve 40 and through pipe 24. The crystals withdrawn from the container 34 are then prepared for commercial use such as sodium sulfate and potassium sulfate, have uses as a fertilizer component, in the manufacture of soap, etc.

In the following examples, all percentages are by weight unless otherwise noted.

EXAMPLE 1

A 100 g. sample of flue dust containing potassium sulfate and sodium sulfate, ratio of 20 to 1, was dissolved in 250 ml. of water. The mixture was stirred and heated slowly to approximately 210° F. The stirring was stopped and the temperature was held at 210° F. After the suspended solids had settled, a 25-ml. aliquot was withdrawn. It was determined that this aliquot contained 21.4 g. of alkali metal salts per 100 ml. of solution.

The original mixture as indicated above was placed in an ice bath, stirred and brought to a temperature of approximately 38° F. After the the suspended solids were allowed to settle, another 25 ml. aliquot was withdrawn. It was determined that this aliquot contained 6.24 g. of alkali metal salts per 100 ml. of solution.

Thus it was concluded that at elevated temperatures water will dissolve a great deal more of the alkali metal salts out of the flue dust than water at room temperature or lower than room temperature.

EXAMPLE 2

One g. of flue dust containing approximately 7.75 per cent of alkali metal salts was washed four times with 100 ml. of hot water each time. The washings were combined and it was determined that of the alkali metal salts originally present in the 1 g. of flue dust approximately 93.3 percent of the weight was dissolved in the washings, leaving approximately 0.53 percent of the alkali metal salts in the undissolved particles.

Thus it was concluded that around 90 percent of the alkali metal salts in flue dust are water soluble.

EXAMPLE 3

To a 100-g. sample of flue dust, containing alkali metal salts, potassium sulfate and sodium sulfate in a ratio of 20 to 1, was added 200 ml. of water and stirred. This was obtained from the second filtration step hereinbelow and contained dissolved alkali metal salts. This slurry was filtered and a 25-ml. aliquot of water was taken. It was found to contain 14 g. of alkali metal salts per liter of water.

To the undissolved dust, dewatered slurry from the above filtration, was added enough water to replace the 25 ml. withdrawn and the water lost in the filtration to bring the volume back to 200 ml. and another 100 g. sample of dust was added and this slurry was stirred. This added water came from the succeeding filtration step and contained dissolved alkali metal salts. Again this slurry was filtered and a 25ml. aliquot was taken. It was found to contain 15.9 g. of alkali metal salts.

The above proceedure was repeated and after filtration it was determined that the water contained 18.2 g. of alkali metal salts.

The above proceedure was again repeated and after the fourth leaching, it was found that the water contained 24.2 g. of alkali metal salts.

Thus it is seen that as the several leaching steps take place with additional flue dust being added and the leaching waters being returned to the original flue dust samples, the concentration of the alkali metal salts increase substantially with each leaching and the water thus contains an increasing amount of these alkali metal salts of which it is necessary to remove same from the flue dust in order to reuse these raw material particles which left the kiln or blast furnace.

EXAMPLE 4

The exact proceedure in Example 3 was followed with the exception the water was heated to around 180° F. up to but below the boiling point. In addition no aliquotes were withdrawn.

After the numbers of successive leachings or washings, the water in the first beaker was placed in an ice bath. The first crystals of the alkali metal salts begun to precipitate out at 88° F. These crystals were analyzed and they contained potassium oxide $K_2O$ 51.0 percent, sodium oxide $Na_2O$ 6.0 percent and $SO_3$ 42.0 percent.

EXAMPLE 5

The exact proceedure in Example 3 was followed except only four leaching or washing steps were used, three 100-g. samples of the flue dust were used and the volume of water used in the first leaching was 200 ml. but in the second, third and fourth dissolving steps dissolving of the solution was approximately the amount of water in the dewatered slurry, 30 ml. to 40 ml.

In the samples of flue dust used in this example there was a total of 16.9 g. of alkali metal salts. In the four steps, it was determined that 4.89 g. of the alkali metal salts present in the original sample were removed from the sample.

This it is seen with the method of the present invention that one is able to successfully remove a minimum of around 30 percent of the soluble alkali metal salts from the flue dust of a furnace or kiln. These waters used in the recovering system are not discharged through any exit, but are maintained within closed system itself, aiding in the increase of concentration of these alkali metal salts in the first leaching step. It is apparent therefore that no pollution problem will exist with the method of the present invention and relatively pure alkali metal salts may be obtained as a by product from this system and sold on the open market to reduce the cost of producing a barrel of cement.

On contaminent which might be present in these purified alkali metal salts is calcium hydroxide, but by using hot water washes in the various stages, this calcium hydroxide is generally precipitated along with the undissolved particles of raw materials. This is due to the fact that calcium hydroxide is more soluble in cold water than in hot water; therefore, when a hot solution is saturated with both the alkali metal salts and also the calcium hydroxide and the solution is cooled only the alkali metal salts precipitate out of the solution.

The exact concentration of the alkali metal salts in the several leaching solutions or the temperature of these solutions obtained from the several stages, is not of importance as long as two conditions are met. The first condition is the temperature in each specific leaching stage is kept high enough to prevent the solution from becoming saturated with the alkali metal salts and the second condition that the concentration of the alkali metal salts in solution in the first leaching step is kept sufficiently high to allow precipitation and crystallization of the alkali metal salts when the solution is cooled.

It is apparent from the detailed description that many modifications and variations in the above specification may be made without departing from the true scope and spirit thereof as defined by the appended claims.

I claim

1. A method for removing alkali metal salts from the exhaust gases emitted from the kilns of a cement-producing operation, said exhaust gases containing unconverted discrete particles of raw materials and volatized alkali metal salts, comprising the steps of:

condensing said volatile salts, mixing said particles and said condensed salts with at least 7 parts by weight of water per part of solid to form a first slurry, mixing said first slurry in a first mixing area, transferring said first slurry to a first separating area, separating said first slurry into a first solution of dissolved salts and undissolved discrete particles, returning said first solution to said first mixing area, transferring said undissolved particles to a second mixing area, mixing said undissolved particles in said second mixing area with water containing dissolved salts to form a second slurry, transferring said second slurry to a second separating zone, separating said second slurry into a second solution of dissolved salts and undissolved discrete particles, transferring said second solution to said first mixing area, transferring said undissolved particles from said second slurry to a third mixing area, mixing said undissolved particles in said third mixing area with water containing dissolved salts to form a third slurry, transporting said third slurry to a third separating area, separating said third slurry into a third solution of dissolved salts and undissolved particles, transferring said third solution to said second mixing area whereby said third solution becomes said water containing dissolved salts which forms said second slurry with said undissolved particles transferred from said first separating zone, transferring said undissolved particles from said third separating zone to a further mixing area, continuing the mixing and separating steps for several additional cycles whereby the slurry formed in each mixing area is separated into a solution of dissolved salts which is sent back to the next preceding mixing area to be the water-containing dissolved-salts mixing with the undissolved particles for forming the slurry for that mixing area and separated into a slurry which is transferring to a next subsequent mixing area, returning the undissolved particles from the last mixing area to said kilns, withdrawing a portion of said first solution from said first mixing area, crystallizing out of said withdrawn portion alkali metal salts crystals, removing said crystals from said solution and returning the solution from which said crystals are removed to a predetermined mixing area.

2. The method of claim 1 in which said alkali metal salts are members selected from the group consisting of sodium sulfate, sodium chloride, potassium sulfate, potassium chloride, lithium sulfite, lithium chloride, rubidium sulfate, rubidium chloride, cesium sulfate and cesium chloride.

3. The method of claim 1 in which water is added to the last mixing area.

4. The method of claim 1 in which the first slurry is maintained at a temperature of between 140° to 200° F., the second slurry is maintained at between 100° to 175° F., the third slurry is maintained at between 60° to 130° F., and the crystallization of alkali metal salts from said withdrawn portion of said first solution is accomplished by cooling said solution.

* * * * *